United States Patent [19]

Chapman

[11] Patent Number: 4,899,097
[45] Date of Patent: Feb. 6, 1990

[54] MOTORIZED TANG DRIVE SYSTEM

[76] Inventor: Leonard T. Chapman, 13760 Chandler Blvd., Van Nuys, Calif. 91401

[21] Appl. No.: 914,490

[22] Filed: Oct. 2, 1986

[51] Int. Cl.⁴ .................................................. B66F 3/34
[52] U.S. Cl. ...................................... 318/663; 318/626; 182/2; 251/129.12
[58] Field of Search ............... 318/663, 686, 626, 678; 251/129.04, 129.11, 129.12, 129.13; 254/8 R, 2 R, 124; 182/2

[56] References Cited

U.S. PATENT DOCUMENTS

| | | | |
|---|---|---|---|
| 2,735,405 | 2/1956 | Hipple | 91/362 |
| 3,103,257 | 9/1963 | Richards | 354/293 |
| 3,168,284 | 2/1965 | Fisher | 254/8 R |
| 3,454,101 | 7/1969 | Breitbarth et al. | 91/459 |
| 3,789,283 | 1/1974 | Kabat | 318/663 X |
| 3,866,759 | 2/1975 | Lucas | 254/8 R |
| 3,963,051 | 6/1976 | Kuhlmann | 318/663 |
| 3,972,506 | 8/1976 | Azuma | 251/129.11 |
| 4,031,442 | 6/1977 | Poppelreiter | 318/663 X |
| 4,109,678 | 8/1978 | Chapman | 137/596.2 |
| 4,191,913 | 3/1980 | Arnold et al. | 318/563 |
| 4,360,187 | 11/1982 | Chapman | 254/8 R |
| 4,361,308 | 11/1982 | Buss | 251/129.12 |
| 4,495,454 | 1/1985 | Collonia | 318/663 |
| 4,528,894 | 7/1985 | Crosby | 92/12 |
| 4,531,082 | 7/1985 | Yoshinada et al. | 318/663 |
| 4,549,124 | 10/1985 | Beier | 318/663 |
| 4,591,773 | 5/1986 | Numata | 318/663 |

Primary Examiner—Bentsu Ro
Attorney, Agent, or Firm—Lyon & Lyon

[57] ABSTRACT

The present invention provides an apparatus for controlling operation of a fluid control valve. In the preferred embodiment, the present invention operates a hydraulic control valve to operate a hydraulic apparatus. The control system of the present invention permits the pre-selected adjustable control of the acceleration and speed of movement of the apparatus to be controlled. Additionally, the control system permits the selection of pre-determined movement limits within which the operation of the hydraulic apparatus may be contained. The control apparatus also senses the amount of actuation of the control valve.

11 Claims, 3 Drawing Sheets

FIG. 5.
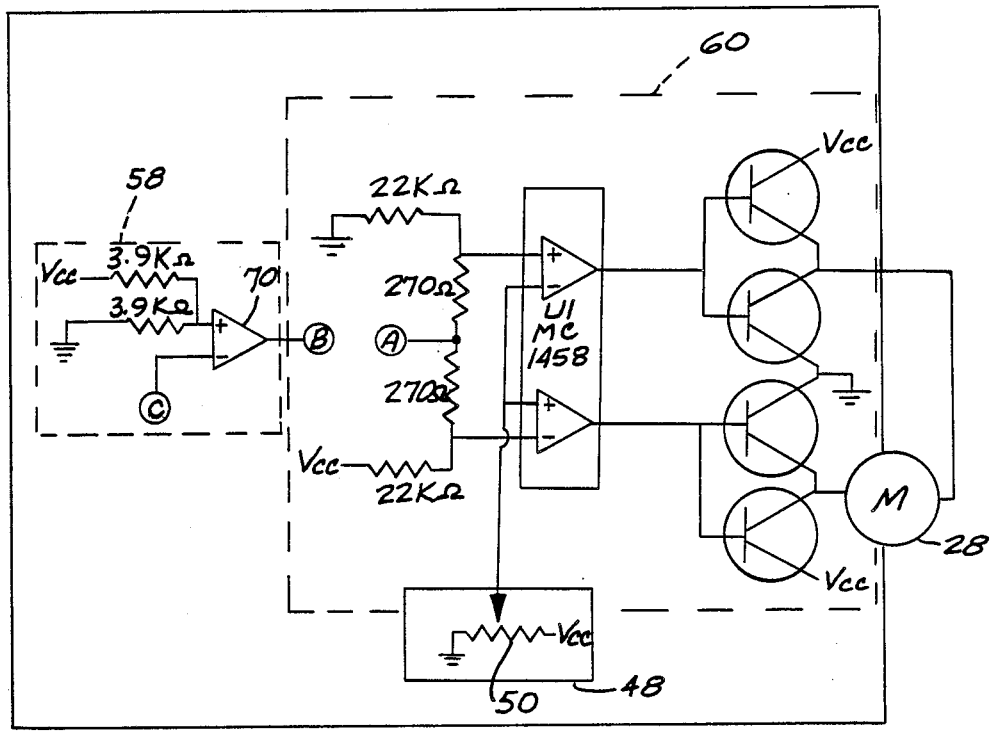
FIG. 6.
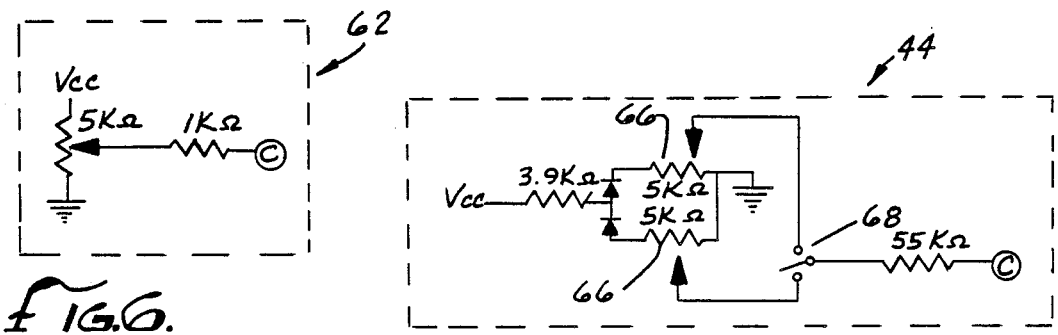
FIG. 7.
FIG. 8.
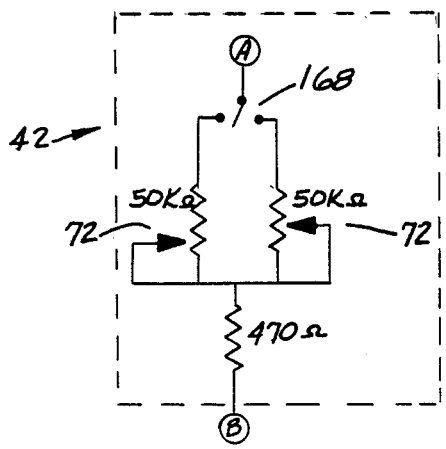

MOTORIZED TANG DRIVE SYSTEM

BACKGROUND

The present invention relates to devices for remote actuation of control valves, and in particular, rotary control valves.

Numerous applications which utilize valves to control fluid flow are well known in the art. The actuation of such valves may also often times control more than merely the flow of fluid. For example, the use of hydraulic components relies heavily on valves to control the flow of hydraulic fluid, thereby controlling a related hydraulic component. Valves for controlling the flow of incompressable fluids such as hydraulic fluid are numerous. Such valves may be rotary actuated such as those described in Chapman, 4,109,678; 1978 and Chapman, U.S. patent application Ser. No. 914,489, filed on Oct. 1, 1986, the disclosures of which are hereby referred to and incorporated herein in full by reference. In many situations, it is desirable to provide a means by which the operation of a such a control valve may be operated under adjustable preselected limits and conditions.

In the utilization of motion picture cameras, video cameras or other photographic equipment, it is often desirable to provide a means by which the camera or equipment may be moved during equipment operation. For example, it is often desirable to change the vertical position of a motion picture or video camera while the camera is operating. In order to obtain a high quality motion picture or video, it is necessary to provide a means which will permit such movement of the camera in a smooth and shock free manner. Typically, movement of the camera in the vertical direction during filming with a camera or the like will be from one known level to a second known level. Therefore, it is desirable to provide a means by which a camera or other photographic equipment may be vertically moved in a smooth and shock free manner from a first elevation to a second preselected elevation.

SUMMARY OF THE PRESENT INVENTION

The present invention provides an apparatus for controlling the actuation of a fluid control valve. The preferred embodiment of the present invention acts to control a rotary fluid control valve. The present invention permits the speed at which the components operate and the movement of the various components within preselected motion limits and the acceleration of the components to be controlled. In addition, means to remotely actuate the present invention are provided. As such, it is an object of the present invention to provide an apparatus which permits the control of a fluid control valve within such adjustable pre-selected constraints. Other and more detailed objects of the present invention will become apparent to those skilled in the art after reviewing the present disclosure.

DESCRIPTION OF THE DRAWINGS

FIG. 5 is a schematic illustration of the preferred electronic control circuitry of the preferred embodiment of the present invention;

FIG. 6 is a schematic illustration of the preferred electronic circuitry of the component positioning sensor in the preferred embodiment of the present invention;

FIG. 7 is a schematic illustration of the preferred electronic circuitry of the movement limiter;

FIG. 8 is a schematic illustration of the preferred electronic circuitry of the speed controller.

DETAILED DESCRIPTION OF THE PREFERRED EMBODIMENT

For purposes of example, the preferred embodiment of the present electronic valve actuator (EVA) is described herein in conjunction with a mobile dolley having a hydraulic extendable arm which is operated through a rotary control valve. As this description is merely for purposes of example, no limitations of the appended claims should be implied or construed as a result of this description.

Figure 1:
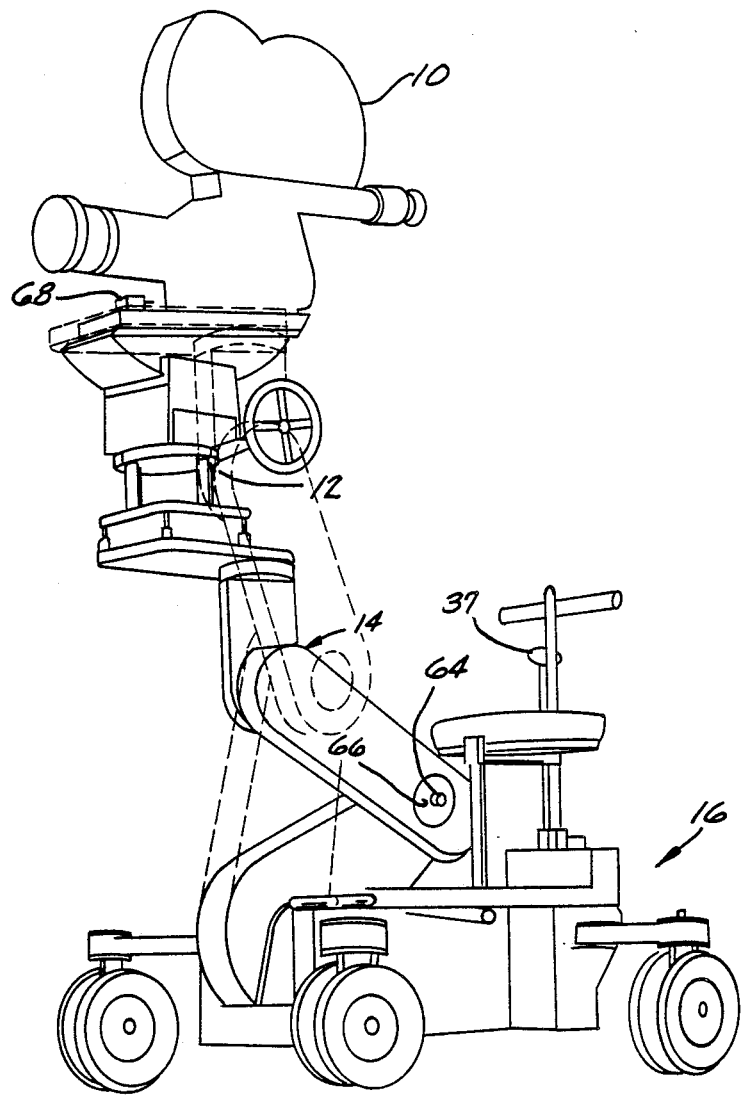
FIG. 1 is a perspective view of a mobile dolly having a motion picture or video camera mounted thereon, on which the preferred embodiment of the present invention may be used.
Figure 4:
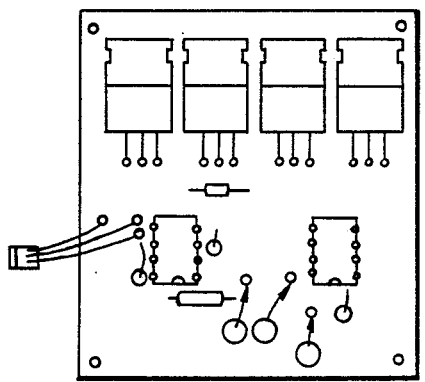
FIG. 4 is a top view of the printed circuit board to which the preferred electrical control circuitry is connected.

As illustrated in FIG. 1, photographic equipment such as a video camera or a movie camera 10 is mounted on a mobile dolley 16 having an extendable arm 14. An example of such a mobile dolley may be found in Chapman, U.S. Pat. No. 4,360,187; 1982, the disclosure of which is hereby referred to and incorporated herein in full by reference.

Figure 2:
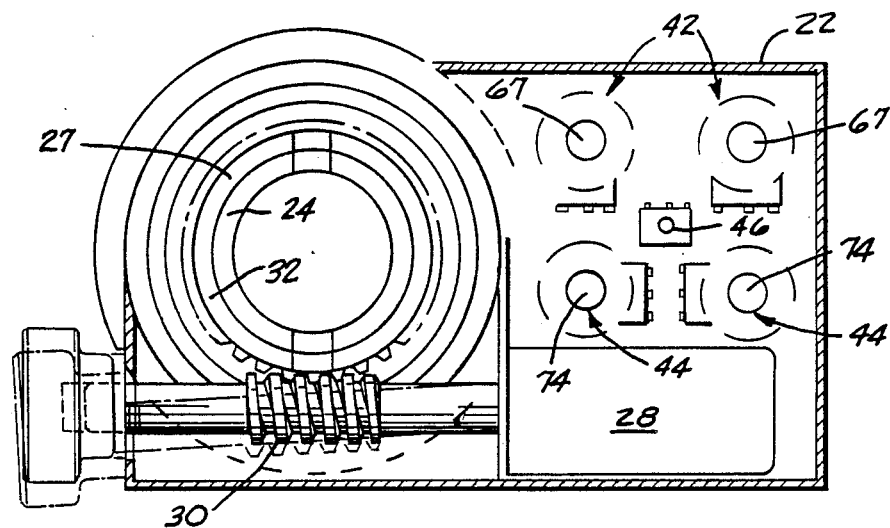
FIG. 2 is a top view of the preferred embodiment of the present invention.
Figure 3:
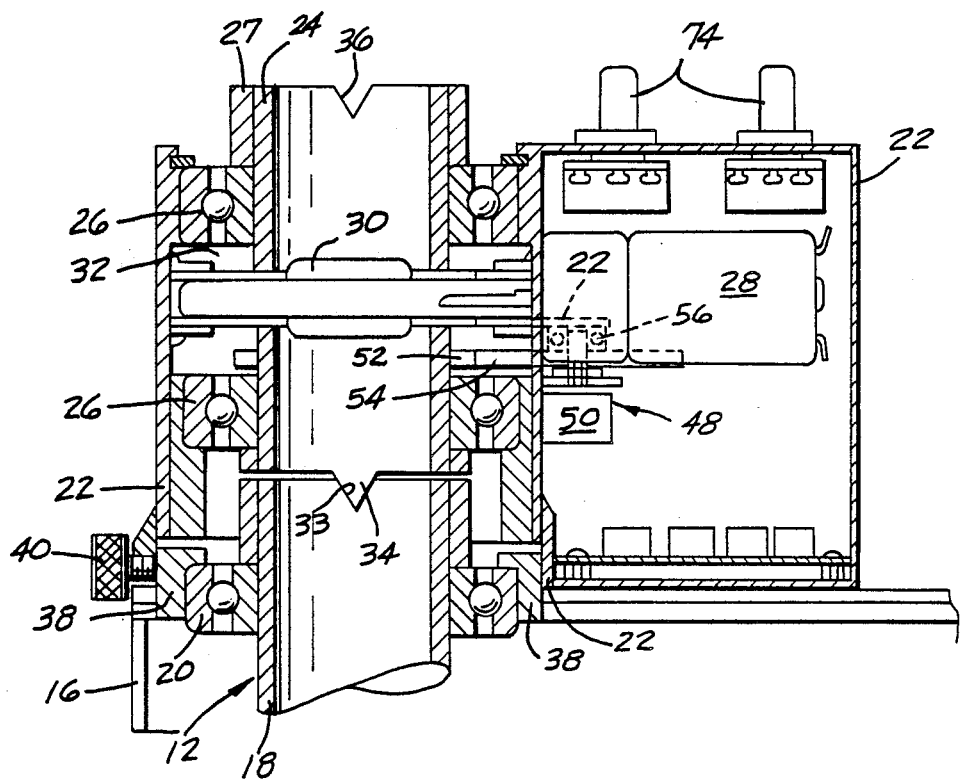
FIG. 3 is a cross-sectional view of the preferred embodiment of the present invention.

Referring to FIGS. 2 and 3, the EVA includes a housing 22. A rotatable actuator 24 shaft and a rotatable support collar 27 are mounted in the housing 22 through bearings 26. The rotary actuated control valve 12 includes a rotatable actuation member 18 which is supported by bearings 20. The rotatable valve actuation member 18 has engagement notches 33 formed in the end of the member 18 which extends from the dolly 16.

As illustrated in FIG. 3, engagement pawls 34 extends from the ends of the actuator 24 and support collar 27 and engage the engagement notches 33 when the present invention is connected to the mobile dolly 16. Similarly, engagement notches 36 are provided in the opposite ends of the actuator shaft 24 and the rotating support collar 27 so as to permit manual actuation of the control valve 12 through not shown manual actuator means.

The EVA is preferably mounted to a dolly 16 by engaging the housing 22 with the shoulder flange 38 extending from the dolly 16 about the valve actuation member 18. Upon aligning the engagement pawls 34 with the valve actuation member engagement notches 33, the EVA may be securely maintained in the proper position by means of a thumb screw 40 or the like. So configured, movement of the dolly extendable arm 14 is controlled by rotation of the rotatable actuation member 24 and support collar 27.

In order to accomplish rotation of the actuator shaft 24 and support collar 27, a motor such as electric motor 28 is provided. Torque from the electric motor 28 is transmitted to the actuator 24 and support collar 27 through a worm 30 and worm gear 32.

As will be understood by those skilled in the art, the speed at which the extendable arm moves depends upon the amount which the rotary control valve 12 is opened. The more the valve is opened, the faster the arm will move. Similarly, the acceleration of the arm may also be controlled by controlling the speed with which the rotary hydraulic control valve 12 is opened or closed. In the present valve actuator, the rotary hydraulic valve 12 is controlled through electronic means which operate to control the motor linked to the rotary control valve 12. As described hereinafter, the present invention includes a speed controller 42, a movement limiter 44, an acceleration switch 46, and valve position sensor 48.

Referring to FIGS. 4–9, the preferred electronic circuitry of the present invention and its operation will hereinafter be described. As illustrated in the figures, the preferred electronic circuitry of the present invention includes a differential amplifier 58 and a driver 60. The differential amplifier 58 receives signals from the motion limiter 44 and a position sensor 62. The driver 60 receives inputs from the valve position sensor 48 and the speed controller 42 which electrically links the differential amplifier 58 with the driver 60.

In the preferred embodiment, the arm position sensor 62 includes, as is illustrated in FIG. 6, a variable resistor such as a potentiometer connected to ground at one end and a known voltage VCC at the other. As shown in FIG. 1, the potentiometer 64 of the position sensor 62 is preferably connected to the pivot 66 connecting the first and second components of the extendable arm 14.

FIG. 7 illustrates the preferred electronic circuitry for limiting movement. As illustrated in that figure, alternative variable resistance such as two potentiometers 66 are provided. The two potentiometers 66 are controlled and may be varied through knobs 67 which are situated on the face of the valve controller as illustrated in FIG. 2.

A switch 68 to selectively connect the voltage VCC to the alternative potentiometers 66 is provided. The switch 68 enables one of the two alternative potentiometers to be linked with the circuit depending upon whether the arm is being extended or retracted. Both the position sensor 62 and the motion limiter 44 are electrically connected to the differential amplifier 58 at point C. As it will be understood by those skilled in the art, the operation amplifier 70 of the differential amplifier 58 provides an inverted voltage to point B of the circuit depending upon the comparison of the signals received from the positive and negative operational amplifier terminals. This voltage is then attenuated through the speed controller 42, illustrated in FIG. 8, and subsequently fed to the driver 60.

The speed controller 42 includes alternative variable resistor means such as two potentiometers 72 which may be alternatively engaged through the switch 168 depending upon whether the arm is being extended or retracted. The switch 168 may be remotely placed so as to enable the remote actuation of the valve 12. Similar to the motion limiter 44, the two speed control potentiometers 72 are controlled and may be varied by knobs 74 which are positoned on the face of the present invention as illustrated in FIGS. 2 and 3.

In addition to the above signals, the driver additionally monitors the position of the rotary control valve 12 through a valve position sensor 48. As illustrated in FIG. 5, the valve position sensor 48 is preferably a variable resistance means such as a potentiometer 50 connected to a ground at one end and a known voltage VCC at the other. In the preferred embodiment, the potentiometer 50 is mounted to the housing 22 through bearings 56 or the like. The variable resistance of the potentiometer 50 is controlled by rotation of the valve actuator 24 through spur gears 52 and 54, as is best illustrated in FIG. 3.

In the driver portion 60 of the preferred electronic circuitry, an integrated circuit such as a UlMC1458 is used as a window comparator. As is understood by those skilled in the art, although a certain voltage is always present at point A of the circuit, unless this voltage exceeds the detent zone of the window comparator, the electronic motor 28 will see no differential voltage and therefore will not operate to drive the valve in either direction. Alternatively, where the voltage at point A is outside the detent zone of the window comparator, thus motor 28 will be driven by a voltage differential in one direction or the other, thereby rotating the rotary control valve in either the clockwise or counter clockwise direction. This rotation of the rotary control valve 12 acts to extend or retract the extendable arm through the flow of hydraulic fluid.

Figure 9:
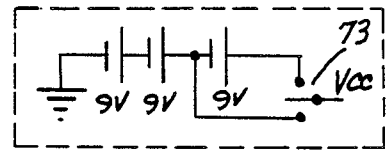
FIG. 9 is a schematic illustration of the power supply.

As is illustrated in FIG. 2, an acceleration switch 46 is also provided. Referring to FIG. 9, the acceleration of the arm is controlled by varying the voltage of VCC applied to the circuit. In the preferred embodiment, a switch 73 acts to selectively provide 18 or 27 volts as illustrated in FIG. 9. As it will be understood to those skilled in the art, the higher the voltage, the faster the electric motor will turn a proscribed amount. Alternatively, as will be understood to those skilled in the art, the voltage supply could be varied through alternative circuitry such as an additional potentiometer, which potentiometer would permit the variation of the voltage reaching the motor. The speed at which the motor operates will directly control the speed at which the rotary control valve will open and close, thereby directly controlling the acceleration of the arm to the preselect speed. Similarly, variation of the variable resistor in the speed controller 42 will alter the voltage differential presented to the motor, thereby altering the amount of rotation of the motor. Again, the more the motor and hydraulic control valve 12 rotates, the faster the arm will extend or retract.

As the above description is for purposes of example, persons skilled in the art will understand that alternative embodiments of the present invention, including alternative electronic control circuitry is possible without departing from the spirit of the present invention as embodied in the appended claims.

I claim:

1. An electronic valve actuator system for controlling movement of an extendable boom arm actuated by a rotary control valve, comprising:
   an actuator arranged to selectively operate the rotary control valve;
   a rotator driver for selectively rotating said actuator; and
   a controller for controlling actuator movement including a speed controller for controlling the speed at which said actuator actuates the rotary control valve,
   a movement limiter for limiting the amount of actuation of said actuator, and
   an actuator position sensor for detecting the position of the actuator, and a boom position sensor for detecting the position of the boom arm.

2. The system of claim 1 wherein said rotator driver comprises a worm gear attached to said actuator; a worm engaged to said worm gear; and a motor drivably attached to said worm.

3. The system of claim 2 wherein said speed controller comprises a switch arranged to selectively provide power to said motor.

4. The system of claim 1 wherein said movement limiter comprises an adjustable resistance.

5. A motion picture camera dolly comprising:
an extendable dolly arm;
a camera operator platform attached to and supported by said dolly arm;
a rotary valve for controlling movement of said dolly arm;
an actuator arranged to removably engage and selectively operate a control valve;
a controller for controlling movement of said actuator, including a worm and worm gear driven by a motor, for actuating said actuator, a speed controller for controlling the speed of said actuator including a switch arranged to selectively provide additional power to said motor;
sensing resistance adjustable in response to actuation of said actuator and electronic circuitry connecting said sensing resistance to said controller, for sensing the amount of actuation of said actuator; and
a position sensor for determining the position of the extendable dolly arm;
wherein the switch of said speed controller is located adjacent to said camera operator platform such that a camera operator may cause the dolly arm to move to a desired position without the need for the operator to view the switch or dolly arm.

6. The dolly of claim 5 further comprising means for releasably and removably mounting said actuator on the dolly arm, to provide for motorized or manual operation of said rotary valve.

7. The dolly of claim 5 further comprising a movement limiter having a first variable resistor to determine a starting point of movement of said dolly arm, and a second variable resistor to determine a stopping point of said dolly arm.

8. The dolly of claim 5 wherein said speed controller further comprises two variable resistors, with travel speed of the dolly arm in each direction of movement being controlled by each of said two variable resistors.

9. The dolly of claim 5 wherein said controller comprises a single three-position switch that can be readily activated to select the direction and start and stop the movement of the dolly arm.

10. The dolly of claim 5 further comprising a worm disengagement for allowing said worm to be quickly disengaged from said worm gear, thereby allowing said actuator to remain installed on the dolly arm with said actuator being freely rotatable for manual operation of said rotary valve.

11. The dolly of claim 5 wherein said motor comprises an electric motor.

* * * * *